United States Patent
Dudar

(10) Patent No.: US 9,291,128 B2
(45) Date of Patent: Mar. 22, 2016

(54) SYSTEM AND METHODS FOR EVAPORATIVE EMISSIONS LEAK DETECTION BASED ON A VEHICLE LOCATION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 14/054,718

(22) Filed: Oct. 15, 2013

(65) Prior Publication Data
US 2015/0105969 A1   Apr. 16, 2015

(51) Int. Cl.
| F02M 25/08 | (2006.01) |
| G01M 15/04 | (2006.01) |
| G01C 21/26 | (2006.01) |
| G01M 3/32 | (2006.01) |

(52) U.S. Cl.
CPC ......... *F02M 25/0809* (2013.01); *G01M 3/3236* (2013.01)

(58) Field of Classification Search
CPC ................. F02M 35/0818; F02M 35/10229; F02M 25/0809
See application file for complete search history.

(56) References Cited

U.S. PATENT DOCUMENTS

| 7,168,297 B2 | 1/2007 | Herzog et al. |
| 7,350,512 B1 * | 4/2008 | Meacham et al. ............ 123/520 |
| 8,019,525 B2 * | 9/2011 | DeBastos et al. ............ 701/102 |
| 8,074,627 B2 | 12/2011 | Siddiqui |
| 8,437,903 B2 | 5/2013 | Willard |
| 2008/0312786 A1 | 12/2008 | Day |
| 2009/0314072 A1 * | 12/2009 | Slusser et al. ............ 73/114.43 |
| 2012/0079873 A1 * | 4/2012 | Jackson et al. ............ 73/49.3 |
| 2012/0215399 A1 | 8/2012 | Jentz et al. |

OTHER PUBLICATIONS

Baltusis, P., "On Board Vehicle Diagnostics," SAE Technical Paper 2004-21-0009, Convergence International Congress & Exposition on Transportation Electronics, 2004, 15 pages.

* cited by examiner

*Primary Examiner* — Mussa A Shaawat
*Assistant Examiner* — Abdhesh Jha
(74) *Attorney, Agent, or Firm* — James Dottavio; Alleman Hall McCoy Russell & Tuttle LLP

(57) ABSTRACT

A method for detecting evaporative emissions system leaks, comprising: adjusting a leak detection threshold based on a vehicle geographical location including jurisdiction borders; and indicating a leak based on the adjusted threshold. In this way, a vehicle may perform OBD EVAP leak tests in accordance with local regulations. This method allows for a single PCM to be installed in all vehicles of a certain model during manufacturing regardless of the jurisdiction where the vehicle will be sold, thereby reducing part complexity and simplifying the manufacturing process.

17 Claims, 4 Drawing Sheets

SYSTEM AND METHODS FOR EVAPORATIVE EMISSIONS LEAK DETECTION BASED ON A VEHICLE LOCATION

BACKGROUND AND SUMMARY

Vehicle emission control systems may be configured to store fuel vapors from fuel tank refueling and diurnal engine operations, and then purge the stored vapors during a subsequent engine operation. In an effort to meet stringent emissions regulations, emission control systems may need to be intermittently diagnosed for the presence of leaks that could release fuel vapors to the atmosphere.

However, different jurisdictions mandate different leak detection thresholds. For example, a subset of states in the United States (referred to as "green states" herein) mandate testing for leaks with a diameter of 0.02" or greater, while other states mandate testing for leaks with a diameter of 0.04" or greater. In contrast, European Union member countries do not require evaporative emissions leak testing. Further, the subset of green states is continually growing. In addition, new regulations are anticipated, such as testing for fuel tank leaks with a diameter of 0.01" or greater in plug-in electric hybrid vehicles (PHEVs).

Compliance with differing evaporative emissions regulations results in challenges for automakers. Powertrain control modules (PCMs) must be calibrated according to the jurisdiction where the vehicle will be operated, increasing component complexity and/or part numbering complexity. Additionally, vehicles operated at or near the border of a green state and a non-green state are at a disadvantage for testing. A vehicle calibrated for green state testing thresholds may abide by overly strict regulations when operating in a non-green state. Similarly, a vehicle calibrated for non-green state testing thresholds may underdiagnose evaporative emissions leaks when operating in a green state.

The inventors herein have developed systems and methods to at least in part address the above issues. In one example, a method for detecting evaporative emissions system leaks, comprising: adjusting a leak detection threshold based on a vehicle geographical location including jurisdiction borders; and indicating a leak based on the adjusted threshold. In this way, a vehicle may perform OBD EVAP leak tests in accordance with local regulations. This method allows for a single PCM to be installed in all vehicles of a certain model during manufacturing regardless of the jurisdiction where the vehicle will be sold, thereby reducing part complexity and simplifying the manufacturing process.

In another example, a method, comprising: determining a vehicle's location via a global positioning system; determining an evaporative emissions leak detection threshold for the jurisdiction comprising the vehicle's location; and running an evaporative emissions leak test using the determined evaporative emissions leak detection threshold. In this way, a vehicle's PCM software does not require additional updates based on the vehicle's location. This method allows for vehicles traversing or updating registration across green state/non-green state borders to be compliant with local regulations without additional software updates.

In yet another example, a system for detecting evaporative emissions leaks in a vehicle, comprising: a global positioning system; an evaporative emissions testing subsystem configured to test for evaporative emissions leaks of at least two sizes; and a controller configured to: determine the vehicle's geographical location via the global positioning system; determine the evaporative emissions leak detection threshold for the jurisdiction comprising the vehicle's geographical location; and run an evaporative emissions leak test using the determined evaporative emissions leak detection threshold. In this way, unnecessary warranty service can be avoided in vehicles traversing green state/non-green state borders. The vehicle is not tied to the stricter green state regulations when running in non-green states.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

Figure 1:
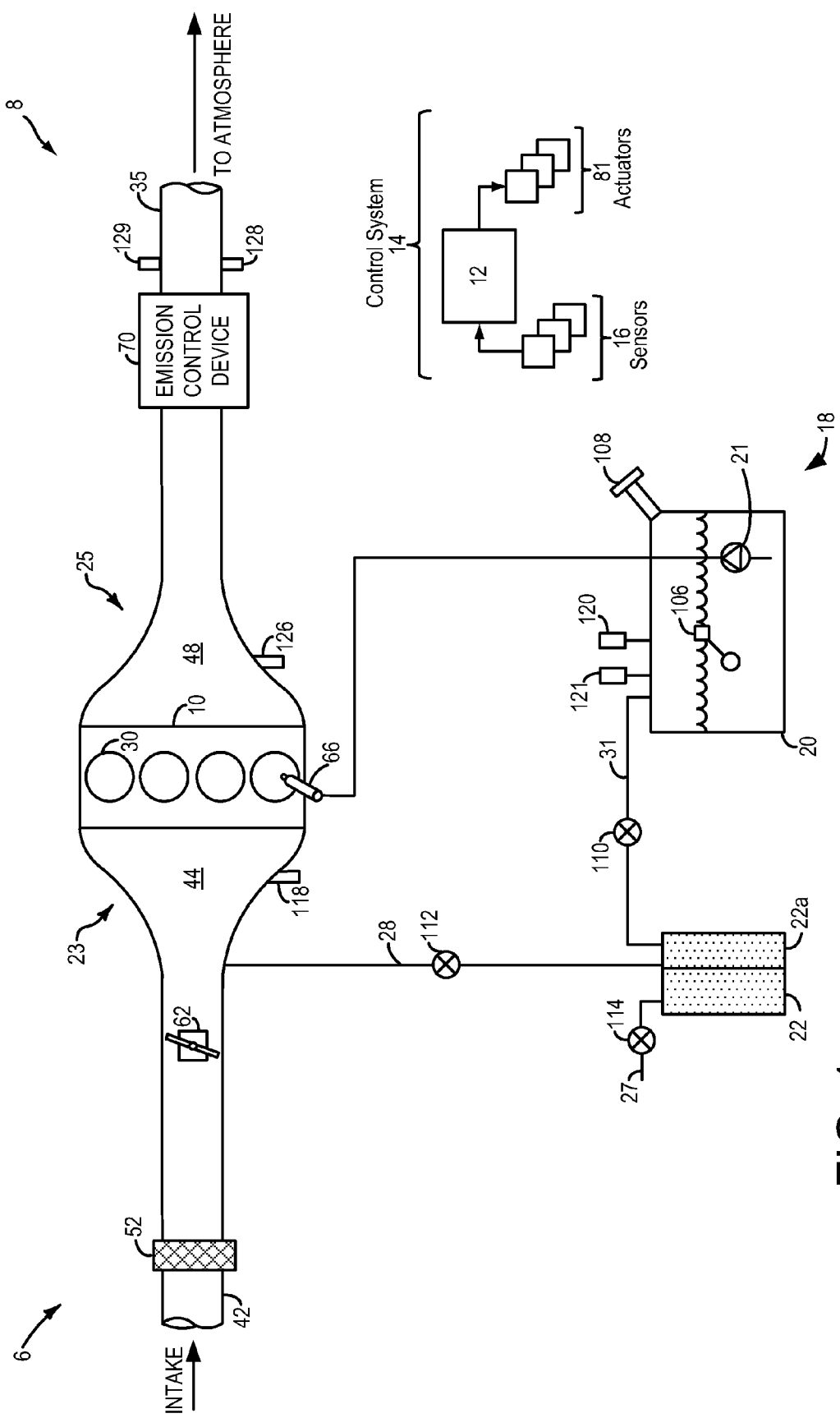
FIG. 1 shows a schematic depiction of an example vehicle engine system coupled to an example fuel system.
Figure 2:
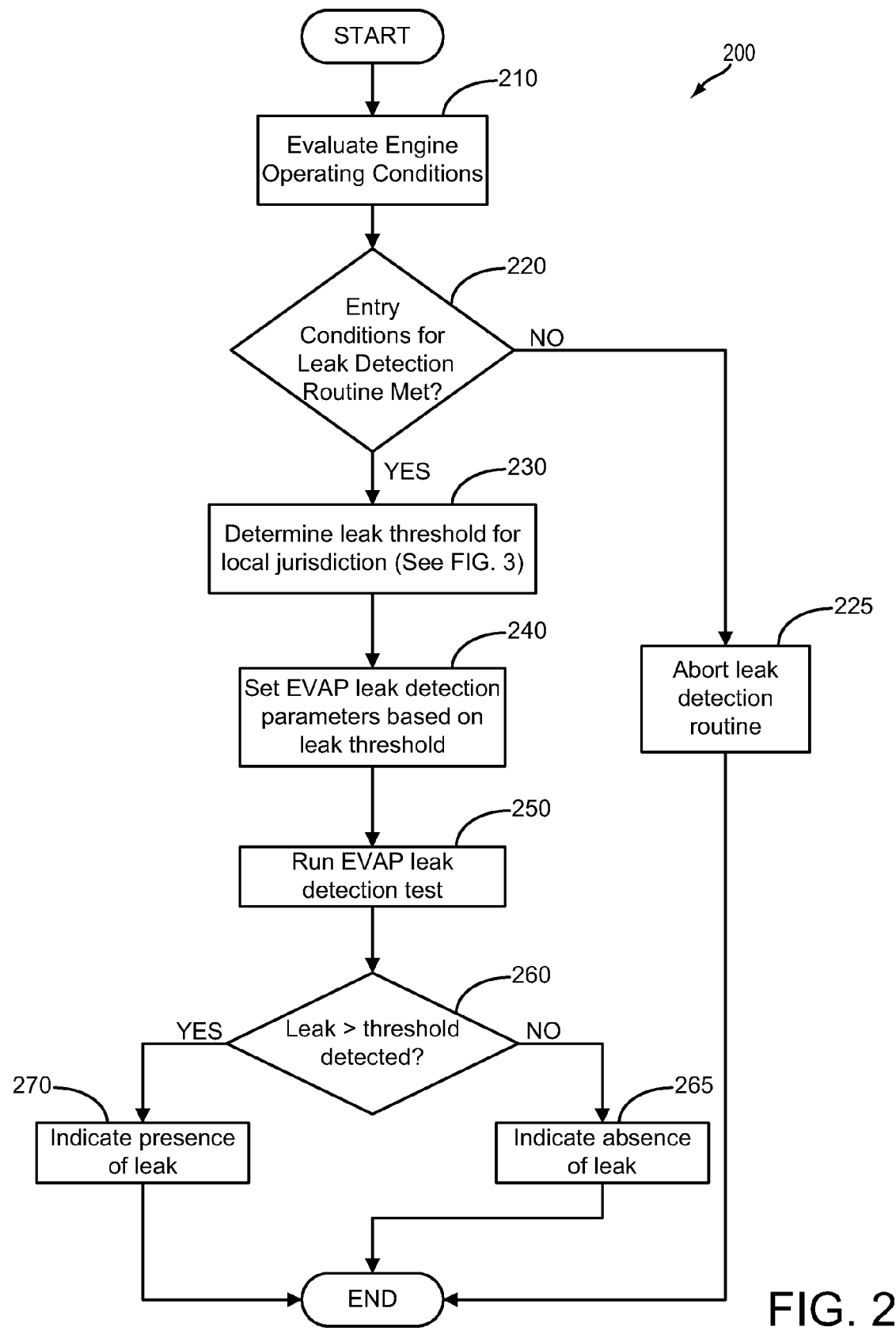
FIG. 2 shows a high level flow chart for diagnosing fuel system integrity based on leak thresholds within a local jurisdiction.
Figure 3:
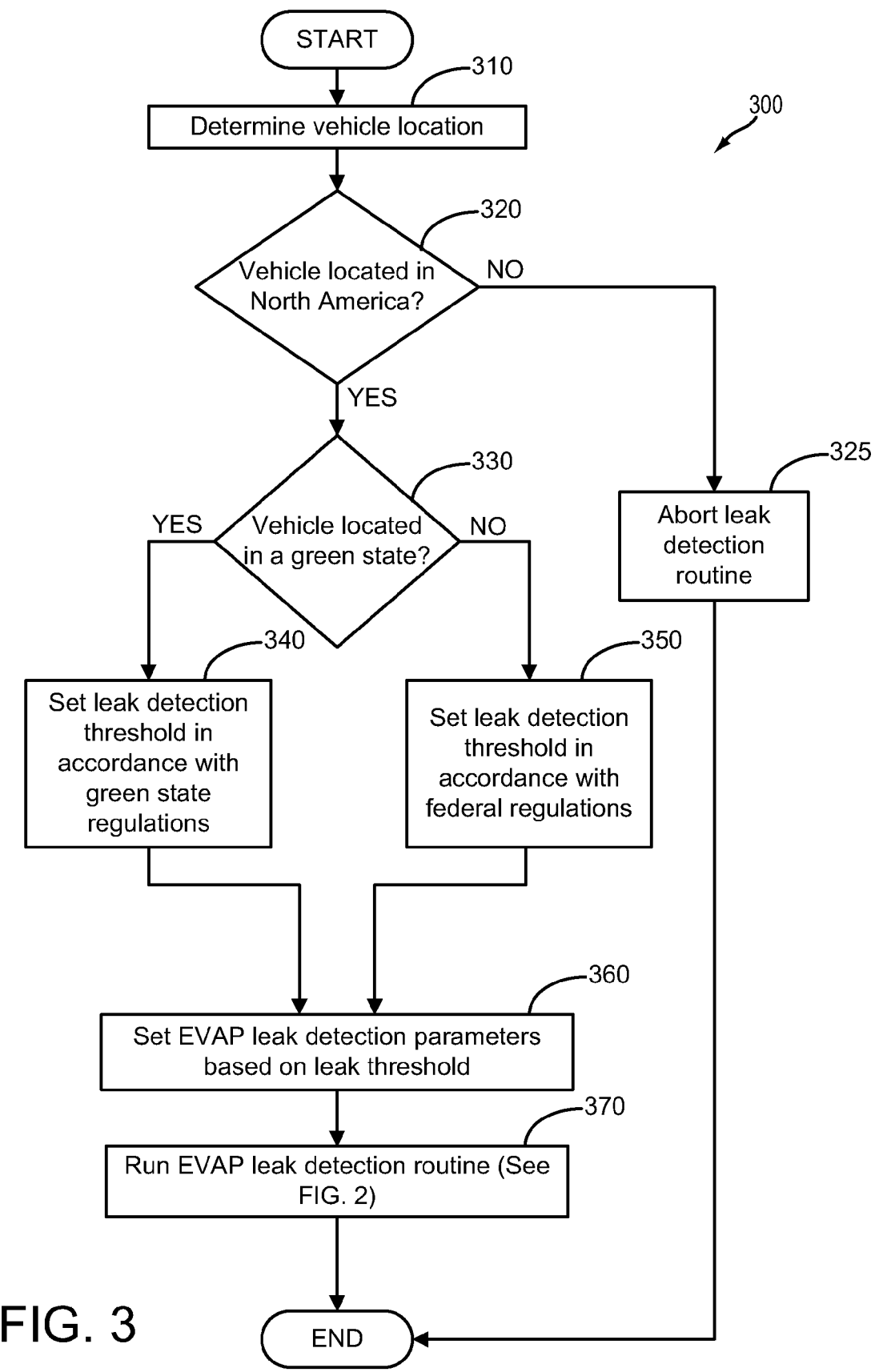
FIG. 3 shows a high level flow chart for determining a leak threshold based on a vehicle location.
Figure 4:
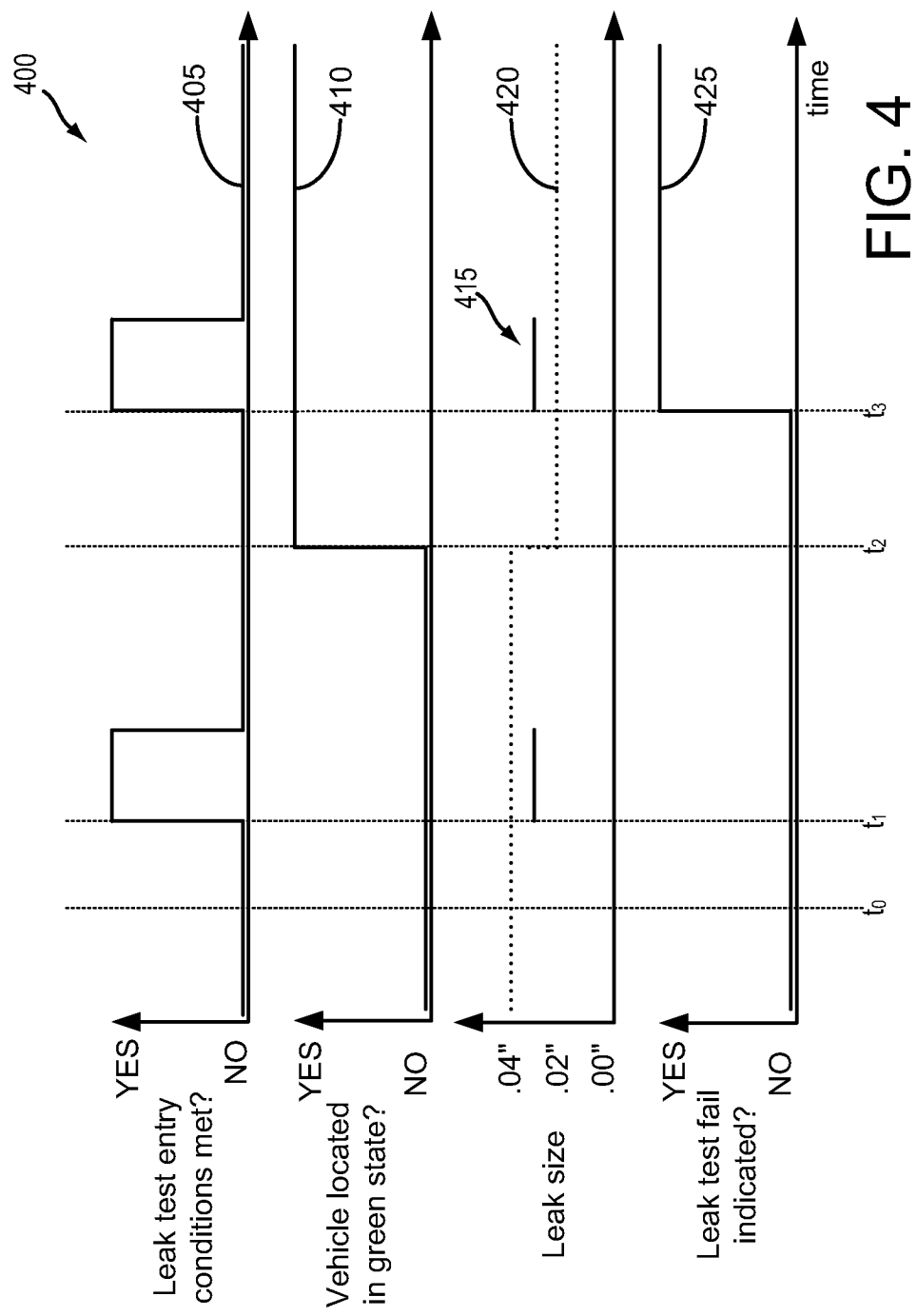
FIG. 4 shows a timeline for an example leak test using the methods of FIGS. 2 and 3.

The following description relates to systems and methods for performing evaporative emissions leak detection in a vehicle, such as the vehicle depicted in FIG. 1. The vehicle may include a fuel system, an evaporative emissions system, a controller, and means of determining the vehicle's geographical location including jurisdictional borders. The controller may be configured to perform evaporative emissions leak detection tests based on the regulations for evaporative emissions leak test applicable to the jurisdiction comprising the vehicle's location, as shown in FIG. 2. The controller may be further configured to determine the vehicle's geographical location and adjust leak detection thresholds accordingly, as shown in FIG. 3. The systems and methods may be applied to vehicles that frequently cross borders between jurisdictions with differing evaporative emissions testing requirements. An example test routine is depicted in FIG. 4.

FIG. 1 shows a schematic depiction of a hybrid vehicle system 6 that can derive propulsion power from engine system 8 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be an open that is closed upon actuation of the canister vent solenoid.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, and pressure sensor 129. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory.

The control system 14 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Example control routines are described herein with regard to FIGS. 2-3.

Controller 12 may also be configured to intermittently perform leak detection routines on fuel system 18 (e.g., fuel vapor recovery system) to confirm that the fuel system is not degraded. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value).

In one example, to perform an engine-on leak test, negative pressure generated at engine intake 23 is applied on the fuel system with CVV 114 closed until a threshold level is reached. In some embodiments, an evaporative leak check module (ELCM) may be coupled to fuel system 18, for example, in vent 27 between CVV 114 and atmosphere. The ELCM may include a pressure generating means (e.g. a vacuum pump or a positive pressure pump), and may be connected to the fuel system via one or more actuatable valves, allowing for one or more sections of the fuel system to be isolated for leak testing.

As such, the leak tests performed may be vacuum-based or negative pressure leak tests. During the negative pressure leak test, CPV 112 and CVV 114 may be kept closed to isolate the fuel system. Vacuum may be applied to the fuel tank or canister side of the fuel system until a threshold vacuum level has been reached. Based on a rate of pressure bleed-up (to atmospheric pressure) and a final stabilized fuel system pressure, the presence of a fuel system leak may be determined. For example, in response to a bleed-up rate that is faster than a threshold rate, a leak may be determined.

In alternate examples, the leak test may be a positive pressure leak test wherein the pump of the ELCM may be a positive pressure pump. Therein, a positive pressure may be applied to the fuel tank or canister side of the fuel system until a threshold pressure level has been reached. Based on a rate of pressure bleed-down to atmospheric pressure and a final stabilized fuel system pressure, the presence of a fuel system leak may be determined.

During a leak test, changes in vacuum or pressure may be compared to expected changes based on operating and environmental conditions. Expected changes may be stored in controller 12, or may be determined empirically. In some example, the ELCM may include one or more reference orifices corresponding to a potential leak size. For example, the ELCM may include a reference orifice with a 0.020" diameter. The leak test may include exerting a vacuum or positive pressure across the reference orifice(s), and comparing pressure changes across the reference orifice to pressure changes in the fuel system. The reference orifice may represent a threshold for leak detection, or may allow for calibration of various leak sizes. If the controller determines the presence of a leak greater than a threshold value, a malfunction indicator lamp (MIL) may be actuated.

The standards and thresholds for leak detection may be determined by local or regional regulations. Some jurisdictions (such as the European Union) do not require EVAP leak detection. In North America, some jurisdictions (e.g. federal states) require testing for leaks that are 0.04" or greater in diameter. Some jurisdictions (e.g. green states) require testing for leaks that are 0.02" or greater in diameter. Future regulations for PHEVs may require testing for leaks that are 0.01" or greater in diameter. As such, controller 12 must be calibrated to detect leaks based on the regulations pertaining to the local jurisdiction where the vehicle is located.

FIG. 2 shows an example high level method 200 for performing fuel system leak detection based on local regulations. In particular method 200 may include determining a leak threshold for the local jurisdiction where the vehicle is currently located, and further include performing a fuel system leak detection routine using the determined leak threshold. Method 200 may be carried out by controller 12, and may be stored as instructions in non-transitory memory in control system 14. Method 200 may begin at 210 by estimating engine operating conditions. Engine operating conditions may be measured, estimated or inferred, and may include various vehicle conditions, such as vehicle speed, as well as various engine operating conditions, such as engine operating mode, engine speed, engine temperature, exhaust temperature, boost level, MAP, MAF, torque demand, horsepower demand, etc.

At 220, method 200 may include determining whether entry conditions for the leak detection routine are met. Entry conditions for the leak detection routine may include a variety of engine and/or fuel system operating conditions and parameters. Additionally, in the case when the engine is included in a hybrid electric vehicle, entry conditions for leak detection may include a variety of vehicle conditions.

For example, entry conditions for leak detection may include an amount of time since a prior leak testing. For example, leak testing may be performed on a set schedule, e.g. leak detection may be performed after a vehicle has traveled a predetermined number of miles since a previous leak test or after a predetermined duration has passed since a previous leak test.

As another example, entry conditions for leak detection may include a temperature of one or more fuel system components being in a predetermined temperature range. For example, temperatures which are too hot or too cold may decrease accuracy of leakage detection. Such a temperature range may depend on the method used to calculate the leak detection and the sensors employed. However, in some examples, leak detection may occur at any temperature.

Entry conditions may include a vacuum supply being greater than a threshold. For example, a fuel tank vacuum greater than a threshold may be used to supply vacuum for the leak detection routine. As another example, entry conditions for leak detection may include an amount of available energy stored, e.g., in an energy storage device, to run a vacuum or positive pressure pump. Thus, it may be confirmed if the state of charge, voltage, etc. of the battery is such that sufficient energy is available to perform the leak test. Additionally entry conditions for leak detection may include whether or not a vehicle is in operation and the amount of power being drawn, e.g., amount of torque, engine RPM, etc. by the vehicle is less than a threshold value. For example, in the case of a hybrid vehicle, the vehicle may be in engine-off operation powered by the energy storage device. In this example, if there is a large draw of energy, e.g. in response to a large torque request, then, in some examples, leak detection may be postponed to reduce the power drawn from the battery for leak detection. Thus entry conditions for leak detection may be based on various operating conditions evaluated at 205, such as speed, torque, etc., or whether auxiliary components, e.g., air conditioning, heat, or other processes, are using more than a threshold amount of stored energy.

As another example, entry conditions for leak detection may include a door opening. For example, leak detection may occur when a driver opens a door, e.g., indicating that the driver is about to leave the vehicle. As another example, entry conditions for leak detection may include a door closing, For example, leak detection may occur when a driver closes the door, e.g., potentially indicating that the car is about to be started. As another example, entry conditions for leak detection may include a key-off event, e.g., as performed by a driver of a vehicle. For example, leak detection may be performed following a key-off event. As another example, entry conditions for leak detection may include a key-on event, e.g., as performed by a driver of a vehicle. For example, leak detection may be performed immediately following a key-on event before the engine starts, or an engine may start in an engine-off mode and leak detection may be performed at each key-on and/or key-off event. As another example, entry conditions for leak detection may be based on a vehicle operating mode change. For example, leak detection may be performed following a transition from engine-on mode to engine-off mode.

As another example, entry conditions for leak detection may include whether or not a leak has previously been detected. For example, if a leak was detected by a prior leak test, then leak testing may not be performed, e.g., until the leak is fixed and an onboard diagnostic system code has been reset. Alternatively, if a leak was detected by a prior leak test, leak testing may be repeated after a predetermined time or distance traveled to validate or invalidate the presence of a leak. As another example, entry conditions for leak detection may include if a refueling event is taking place. For example, leak detection may not be performed while the fuel tank is being refilled or when the fuel cap is off, etc.

If entry conditions for leak detection are not met, method 200 may proceed to 225. At 225, method 200 may include aborting the leak detection routine. Aborting the leak detection routine may include recording the aborted routine and altering one or more entry conditions for subsequent leak detection routines. Method 200 may then end.

If entry conditions for leak detection are met, method 200 may proceed to 230. At 230, method 200 may include determining a leak threshold for the local jurisdiction where the vehicle is located. A subroutine for determining a leak threshold for the local jurisdiction where the vehicle is located is elaborated in FIG. 3. Briefly, vehicle location may be determined via an on-board GPS or other means. The mandated leak threshold for the local jurisdiction where the vehicle is located may then be determined via a lookup table stored in control system 14, via the internet, or via other appropriate means.

Continuing at 240, method 200 may include setting EVAP leak test parameters based on the determined leak threshold. The EVAP leak test parameters may include an expected rate of change in vacuum or pressure that would occur during testing for a leak of threshold size. For example, if the threshold size is 0.04", the expected rate of change in vacuum or pressure may be different than for a threshold size of 0.02". If a reference orifice is used, for example, in conjunction with an ELCM, a modifying factor may be used to calibrate the rate of change of vacuum or pressure across the reference orifice if the reference orifice has a larger or smaller diameter than the threshold leak size. If multiple reference orifices are available, the EVAP leak test parameters may include drawing a pressure or vacuum across the appropriate sized reference orifice. EVAP leak test parameters may include selecting an appropriate lookup table to determine if detected pressure or vacuum changes are indicative of a threshold sized leak.

Continuing at 250, method 200 may include running an EVAP leak test based on the updated leak test parameters. As described herein with regards to FIG. 1, the EVAP leak test may be performed in numerous ways based on vehicle and engine configuration and vehicle and engine operating parameters. In one example, to perform an engine-on leak test, negative pressure generated at engine intake 23 is applied on the fuel system with CVV 114 closed until a threshold level is reached. In some embodiments, an evaporative leak check module (ELCM) may be coupled to fuel system 18, for example, in vent 27 between CVV 114 and atmosphere. The ELCM may include a pressure generating means (e.g. a vacuum pump or a positive pressure pump), and may be connected to the fuel system via one or more actuatable valves, allowing for one or more sections of the fuel system to be isolated for leak testing. In some embodiments, other EVAP leak tests appropriate for the vehicle and engine configuration and current vehicle and engine operating parameters may be used.

Continuing at 260, method 200 may include determining whether a leak greater than a leak threshold has been detected. Determining whether a leak greater than a leak threshold has been detected may include comparing the results of the EVAP leak test performed at 250 to the threshold values and adjusted parameters determined in accordance with the mandated regulations for the vehicle's location. If no leak greater than the threshold is detected, method 200 may proceed to 265. At 265, method 200 may include indicating the absence of a leak. Indicating the absence of a leak may include recording the results of the leak detection routine in control system 14, e.g. setting a pass flag. If a leak greater than the threshold is detected, method 200 may proceed to 270. At 270, method 200 may include indicating the presence of a leak. Indicating the presence of a leak may include recording the results of the leak detection routine in control system 14, e.g. setting a fail flag. In some embodiments, indicating the presence of a leak may include lighting a malfunction indicator lamp. In some embodiments, indicating the presence of a leak may include altering one or more entry conditions for a leak detection routine, as described herein.

FIG. 3 shows an example high level method 300 for determining leak detection thresholds based on a vehicle's location. In particular, method 300 may include determining a vehicle's location, and further determining the mandated leak detection threshold for the jurisdiction where the vehicle is located. Method 300 may be run as a subroutine of an EVAP leak detection routine, such as method 200 as described herein and with regards to FIG. 2, or other appropriate leak detection routines. Alternatively, method 300 may be run independently and used to update parameters that may be used by EVAP leak detection routines. Method 300 may be run by controller 12 and may be stored as instructions in non-transitory memory in control system 14.

Method 300 may begin at 310 by determining the vehicle's location. Determining a vehicle's location may include obtaining location information from a GPS, for example. The vehicle's location may also be input by a vehicle operator, or obtained through local communication networks, e.g. Bluetooth communication with nearby devices. The vehicle's location may include geopolitical boundaries, including local, state or provincial, federal, and/or international jurisdictions or regions. Information obtained from the GPS may be input to control system 14 via a CAN network.

Continuing at 320, method 300 may include determining whether the vehicle is located in North America or other jurisdictions which mandate periodic on-board EVAP testing. If the vehicle is not located in North America or another jurisdiction that mandates periodic on-board EVAP testing (e.g. the vehicle is located within the European Union), method 300 may proceed to 325. At 325, method 300 may include aborting a leak detection routine. Aborting a leak detection routine may include aborting a routine that is running method 300 as a subroutine. Aborting a leak detection routine may also include setting a location flag indicating that the vehicle is located in a jurisdiction that does not require periodic EVAP leak testing. Method 300 may be run periodically without running an EVAP leak detection routine to determine whether the vehicle remains located in a jurisdiction that does not requires periodic EVAP leak testing. Method 300 may then end.

If the vehicle is determined to be in North America or another jurisdiction that mandates periodic on-board EVAP testing, method 300 may proceed to 330. At 330, method 300 may include determining whether the vehicle is located in a green state, or other jurisdiction with green state regulations. Determining whether the vehicle is located in a green state may include accessing a look-up table where GPS coordinate information may be cross-referenced to EVAP leak testing regulations. The look-up table may be stored in control system 14, or maybe accessed through the internet, through the GPS, or other communications networks. A green state, as used herein, refers to jurisdictions which require EVAP leak testing for leaks that are smaller in diameter than federal regulations require. For example, federal regulations in the United States currently mandate EVAP testing for leaks with a diameter of 0.04", while green states mandate EVAP testing for leaks with a diameter of 0.02". Future regulations may require certain vehicles, such as PHEVs to test for fuel tank leaks with a diameter of 0.01". As such, method 300 may simply include cross-referencing a vehicle's location with a look-up table of current regulations, and not specifically include a branch point for green state/non-green state determination.

If the vehicle is determined to be located in a green state, method 300 may proceed to 340. At 340, method 300 may include setting a leak detection threshold in accordance with green state regulations. As described herein, current green state regulations mandate EVAP testing for leaks with a diameter of 0.02", but this threshold may change as regulations are updated. If the vehicle is determined to not be located in a green state, method 300 may proceed to 350. At 350, method 300 may include setting a leak detection threshold in accordance with federal, non-green state regulations. As described herein, current federal regulations mandate EVAP testing for leaks with a diameter of 0.04", but this threshold may change as regulations are updated.

Following the setting of a leak detection threshold at 340 or 350, method 300 may proceed to 360. At 360, method 300 may include setting EVAP leak test parameters based on the determined leak threshold. The EVAP leak test parameters may include an expected rate of change in vacuum or pressure that would occur during testing for a leak of threshold size. For example, if the threshold size is 0.04", the expected rate of change in vacuum or pressure may be different than for a threshold size of 0.02". If a reference orifice is used, for example, in conjunction with an ELCM, a modifying factor may be used to calibrate the rate of change of vacuum or pressure across the reference orifice if the reference orifice has a larger or smaller diameter than the threshold leak size. If multiple reference orifices are available, the EVAP leak test parameters may include drawing a pressure or vacuum across the appropriate sized reference orifice. EVAP leak test parameters may include selecting an appropriate lookup table to determine if detected pressure or vacuum changes are indicative of a threshold sized leak.

Continuing at 370, method 300 may include running an EVAP leak test based on the updated leak test parameters. An example EVAP leak test routine is described herein and with regards to FIG. 2. Method 300 may then end.

The system described herein and shown in FIG. 1 along with the methods described herein and shown in FIGS. 2 and 3 may enable one or more systems and one or more methods. In one example, a method for detecting evaporative emissions system leaks, comprising: adjusting a leak detection threshold based on a vehicle geographical location including jurisdiction borders; and indicating a leak based on the adjusted threshold. Adjusting the leak detection threshold based on the vehicle geographical location including jurisdiction borders may further comprise: determining the vehicle geographical location including jurisdiction borders via a GPS coupled to the vehicle. The method may further comprise determining a mandated leak detection threshold based on the vehicle geographical location including jurisdiction borders via a lookup table. The method may further comprise: adjusting one or more leak detection test parameters based on the adjusted threshold. The one or more parameters may include an expected change in pressure in a sector of an evaporative emission system from a first instance to a second instance. The sector of the evaporative emission system may include a fuel tank. The one or more parameters may include a multiplier, the multiplier based on a ratio of the adjusted threshold to a reference orifice. The reference orifice may be coupled to an evaporative leak check module included in the vehicle. Indicating a leak based on the adjusted threshold may include actuating a malfunction indicator lamp. The technical result of implementing this method is a reduction in part complexity, calibration release complexity, part numbering complexity, and a more streamlined manufacturing process. By implementing this method, vehicles of the same model may be manufactured with a single PCM release, regardless of the jurisdiction where the vehicle will be sold. The vehicle may then perform OBD EVAP leak tests in accordance with local regulations for all potential jurisdictions where the vehicle may be sold.

In another example, a method, comprising: determining a vehicle's location via a GPS; determining an evaporative emissions leak detection threshold for the jurisdiction comprising the vehicle's location; and running an evaporative emissions leak test using the determined evaporative emissions leak detection threshold. The method may further comprise: adjusting one or more leak detection test parameters based on the adjusted threshold. The one or more parameters may include an expected change in pressure in a sector of an evaporative emission system from a beginning of the leak detection test to the end of the leak detection test. Running an evaporative emissions leak test using the determined evaporative emissions leak detection threshold may further comprise: applying a pressure or vacuum to a reference orifice. The method may further comprise: indicating a leak based on the determined evaporative emissions leak detection threshold. The technical result of implementing this method is that vehicles traversing or updating registration across green state/non-green state borders to be compliant with local regulations without additional software updates. Additionally, as new regulations are passed requiring stricter EVAP testing, and/or as more jurisdictions adopt green state regulations, the vehicle will be able to perform OBD EVAP testing in accordance with local regulations without requiring additional software updates.

In yet another example, a system for detecting evaporative emissions leaks in a vehicle, comprising: a global positioning system; an evaporative emissions testing subsystem configured to test for evaporative emissions leaks of at least two sizes; and a controller configured to: determine the vehicle's geographical location via the global positioning system; determine the evaporative emissions leak detection threshold for the jurisdiction comprising the vehicle's geographical location; and run an evaporative emissions leak test using the determined evaporative emissions leak detection threshold. The system may further comprise an evaporative leak check module configured to apply a pressure gradient to a sector of an evaporative emissions system of the vehicle. The evaporative leak check module may be further configured to apply a pressure gradient to a reference orifice. The controller may be further configured to: adjust one or more leak detection test parameters based on the determined evaporative emissions leak detection threshold. The one or more leak detection test parameters may include a multiplier, the multiplier based on a ratio of the determined evaporative emissions leak detection threshold to a reference orifice. The at least two sizes may include 0.04" and 0.02". The technical result of implementing this method is a reduction in unnecessary warranty service in vehicles traversing green state/non-green state borders. The vehicle is not tied to the stricter green state regulations when running in non-green states, but remains capable of complying with green state regulations.

FIG. 4 shows a timeline 400 for an example leak test for a vehicle using the methods of FIGS. 2 and 3. In this example, the vehicle is being driven from a non-green state to a green state within North America. Timeline 400 includes plot 405, indicating whether leak test entry conditions are met. Timeline 400 also includes plot 410, indicating whether the vehicle is located in a green state; plot 415, indicating the size of a detected leak; and plot 425, indicating whether a leak test fail should be indicated. Line 420 represents the threshold for leak detection based on the jurisdiction where the vehicle is currently located.

At time $t_0$, leak test entry conditions are not met, as shown by plot 405. The vehicle is not located in a green state, as shown by plot 410. As such, the threshold for leak detection is set at 0.04", as shown by line 420.

At time $t_1$, leak test entry conditions are met, as shown by plot 405. An EVAP leak test is performed with the threshold for leak detection set at 0.04". As shown by plot 415, a leak is detected with a diameter of ~0.03", falling below the threshold for leak detection. As such, no leak test fail is indicated, as shown by plot 425.

At time $t_2$, the vehicle location changes from a non-green state to a green state. As such, the threshold for leak detection is updated from 0.04" to 0.02" as shown by line 420. At time $t_3$, leak test entry conditions are met, as shown by plot 405. An EVAP leak test is performed with the threshold for leak detection set at 0.02". As shown by plot 415, a leak is detected with a diameter of ~0.03", falling above the threshold for leak detection. As such, a leak test fail is indicated, as shown by plot 425.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for detecting evaporative emissions system leaks of a vehicle, comprising:
via a controller onboard the vehicle with instructions stored in non-transitory memory:
receiving updated software modules and information through the internet, the updated modules stored in the non-transitory memory, and receiving a geographical location including jurisdiction borders via a GPS coupled to the vehicle, and cross-referencing information received from GPS to information from the internet to determine local weather conditions and local vehicle regulations;
adjusting a leak detection threshold stored in memory based on the vehicle geographical location including jurisdiction borders and the cross-referenced local vehicle regulations;
adjusting one or more leak detection test parameters based on the adjusted leak detection threshold; and
indicating a leak based on the adjusted leak detection threshold, the vehicle being a hybrid vehicle.

2. The method of claim 1, further comprising:
determining a mandated leak detection threshold based on the vehicle geographical location including jurisdiction borders via a lookup table.

3. The method of claim 1, where the one or more leak detection test parameters include an expected change in pressure in a sector of an evaporative emission system from a first instance to a second instance.

4. The method of claim 3, where the sector of the evaporative emission system includes a fuel tank.

5. The method of claim 1, where the one or more leak detection test parameters include a multiplier, the multiplier based on a ratio of the adjusted leak detection threshold to a reference orifice.

6. The method of claim 5, where the reference orifice is coupled to an evaporative leak check module.

7. The method of claim 1, where indicating a leak based on the adjusted leak detection threshold includes actuating a malfunction indicator lamp.

8. A method, comprising:
via a controller onboard the vehicle with instructions stored in non-transitory memory:
receiving information through the internet;
receiving a geographical location including jurisdiction borders via a GPS coupled to the vehicle;
determining a vehicle's location via the geographical information;
cross-referencing information received from GPS to information from the internet to determine local weather conditions and local vehicle regulations;
determining an evaporative emissions leak detection threshold for a jurisdiction comprising the vehicle's location based on the local vehicle regulations;
adjusting one or more leak detection test parameters based on the determined evaporative emissions leak detection threshold; and
running an evaporative emissions leak test using the determined evaporative emissions leak detection threshold and the adjusted test parameters.

9. The method of claim 8, where the one or more leak detection test parameters include an expected change in pressure in a sector of an evaporative emission system from a beginning of a leak detection test to an end of the leak detection test.

10. The method of claim 8, where running an evaporative emissions leak test using the determined evaporative emissions leak detection threshold further comprises applying a pressure or vacuum to a reference orifice.

11. The method of claim 8, further comprising:
 indicating a leak based on the determined evaporative emissions leak detection threshold.

12. A system for detecting evaporative emissions leaks in a vehicle, comprising:
 a global positioning system;
 an evaporative emissions testing subsystem configured to test for evaporative emissions leaks of at least two sizes; and
 a controller configured to:
  receive information through the internet;
  receive a geographical location including jurisdiction borders via the GPS coupled to the vehicle;
  cross-reference information received from the GPS to information from the internet to determine local weather conditions and local vehicle regulations;
  determine the vehicle's geographical location via the global positioning system;
  determine an evaporative emissions leak detection threshold for a jurisdiction comprising the vehicle's geographical location and the local vehicle regulations; and
  run an evaporative emissions leak test using the determined evaporative emissions leak detection threshold.

13. The system of claim 12, further comprising:
 an evaporative leak check module configured to apply a pressure gradient to a sector of an evaporative emissions system of the vehicle.

14. The system of claim 13, where the evaporative leak check module is further configured to apply a pressure gradient to a reference orifice.

15. The system of claim 14, where the controller is further configured to adjust one or more leak detection test parameters based on the determined evaporative emissions leak detection threshold.

16. The system of claim 15, where the one or more leak detection test parameters include a multiplier, the multiplier based on a ratio of the determined evaporative emissions leak detection threshold to the reference orifice.

17. The system of claim 12, where the at least two sizes include 0.04" and 0.02".

* * * * *